Dec. 3, 1940.   H. W. KEEVIL   2,223,371
FLAW DETECTING APPARATUS
Filed Sept. 17, 1937
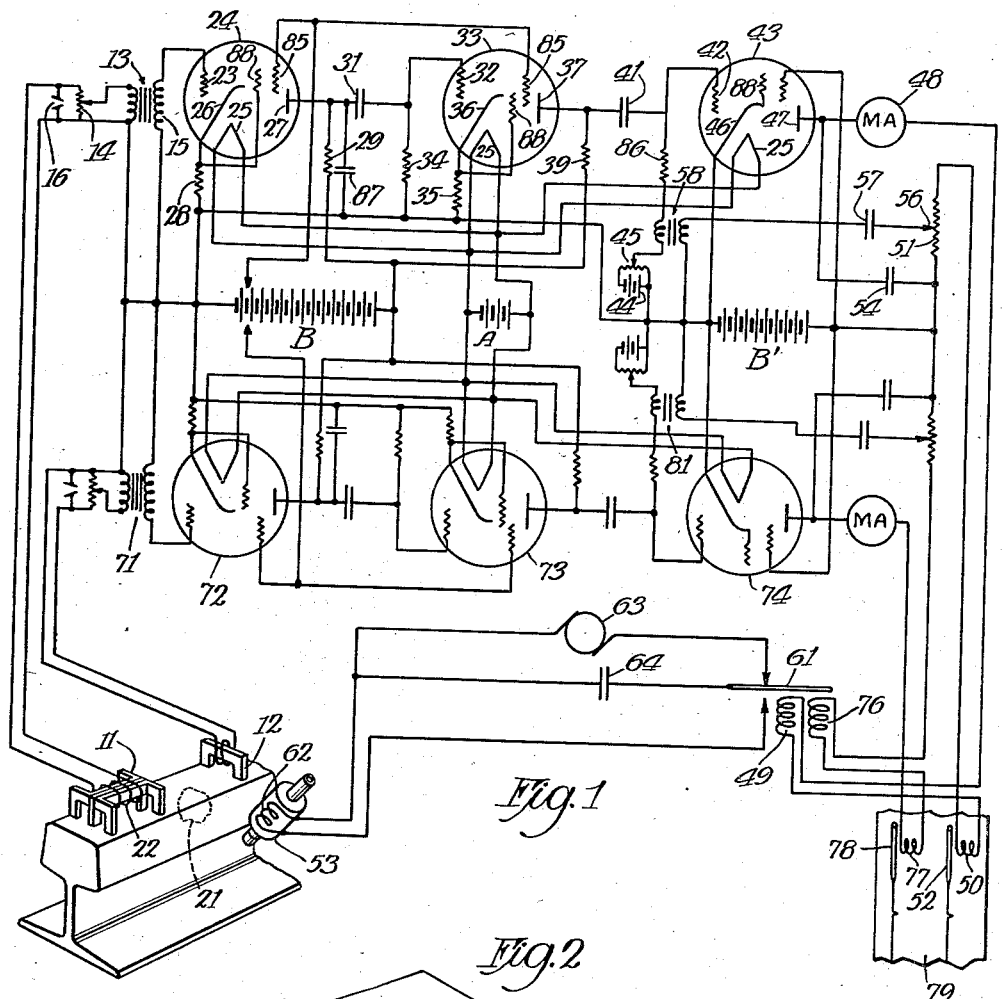
Fig.1
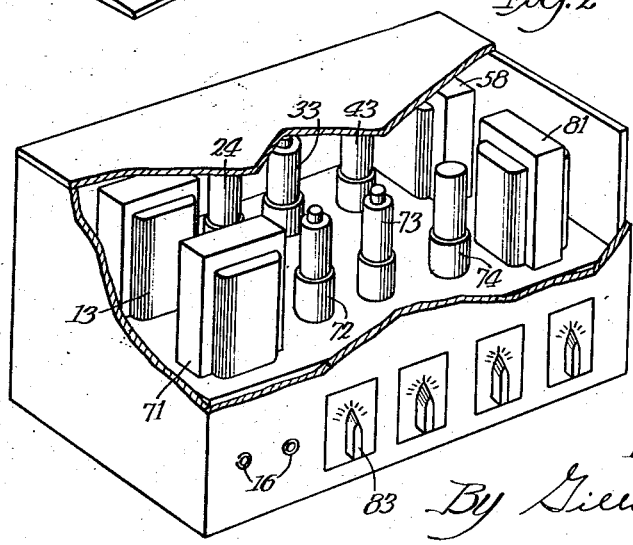
Fig.2
Fig.3
Fig.4
Inventor
Henry W. Keevil
By Gillson Mann & Co
Attys.

Patented Dec. 3, 1940

2,223,371

UNITED STATES PATENT OFFICE 2,223,371

FLAW DETECTING APPARATUS

Henry W. Keevil, Highland Park, Ill.

Application September 17, 1937, Serial No. 164,374

11 Claims. (Cl. 175—183)

In detecting hidden flaws in rails by known electrical and magnetic methods, the ultimate objective is to be able to use detecting apparatus that is sensitive enough to detect small fissures, but selective enough to avoid false indications. The detecting equipment ordinarily performs two functions, one being to operate an indicator such as a pen on a record tape in the detector car, and the other to operate a paint gun carried by the car adjacent to the rail to place a small daub of paint on the rail at the point of the flaw. Both the recording pen and the paint gun are operated through relays, which in turn are operated in response to the pick-up device (usually an induction coil) through an amplifying system. The relays, however, are necessarily of rather high inductance with the result that if the impulse generated in the detector unit adjacent the rail is relatively weak, it may not operate the relays. This is particularly true because of the fact that the voltage curve of an induced impulse is usually similar to a sine wave or perhaps even sharper at its crest, and therefore even though the voltage may be theoretically high enough to cause the amplifying system to actuate the relays, the duration of this peak voltage may be too short. At the same time it is not desirable to make the amplifying system so powerful that it will cause the relays to actuate on the slightest impulse from the pickup since there are inevitably some relatively weak impulses due to surface irregularities in the track which should not effectively actuate the detecting system.

An object of the present invention is therefore to solve the problem of causing the indicating relays to actuate with dependability for that type of impulse indicating a flaw, even though it be extremely weak, while avoiding operation due to different and weaker impulses which do not indicate flaws. According to the present invention this object is accomplished by providing a special amplifying system having certain features which contribute to accomplish the desired result. One feature is the use of a transformer coupling between the inductive pick-up device and the amplifier which tends to filter out the slight inductive impulses caused by irregularities in the rail surface. Another is the provision of an extremely sensitive regenerative amplifying circuit which produces a somewhat stronger output current wave of a more rectangular or flat-topped shape than the inductive impulse comprising the input wave transmitted to the amplifying system by the transformer. This tends to provide an adequate operating current for the pen relays over a period of time corresponding approximately to the duration of the original inductive impulse. Another feature is the provision of a separate B battery for the last stage of amplification so that the relatively heavy changes of current flow in the output circuits will not be returned to the first stages of amplificaiton to cause instability in the circuit. Still another feature is the provision of a by-pass condenser across the pen and paint gun relays to further stabilize the circuit.

Further objects and advantages of the invention will appear as the description is read in connection with the accompanying drawing, in which:

Fig. 1 is a diagrammatic illustration of the system chosen for illustration of the invention.

Fig. 2 is a perspective view of an amplifying unit with a portion of the case broken away to show the arrangement of parts.

Fig. 3 is a view indicating the shape of voltage wave which might be produced by the pick-up unit after conventional amplification and rectification.

Fig. 4 represents the type of voltage wave which is produced by the amplifier of the present invention.

A preferred embodiment of the invention has been shown in the drawing and will hereinafter be described, all as required by Sec. 4888 of the Revised Statutes, but the appended claims are not to be limited by the specific disclosure unless required by the prior art. This illustrated embodiment duplicates some elements of the system, using two detector units 11 and 12, for example, but for the sake of simplicity the system as affected by the unit 11 will first be described.

The unit 11 is connected with the primary coil of a transformer 13 through a potentiometer 14, which may be adjusted to control the initial selectivity of the equipment or, in other words, to determine the strength of the initial inductive impulse which is necessary to induce an effective impulse in the secondary coil 15 of the transformer. The transformer not only acts to match the impedance of the pick-up to the impedance of the grid circuit for greatest power transfer, but also acts as a filter to stop small waves such as may be caused by surface irregularities in the rail. It might be explained that this filtering action is due to the inherent characteristic of iron core transformers in that the iron core, even though a soft iron, retains a very slight residual magnetism. In the case of extremely weak impulses a substantial portion of the energy available is dissipated in overcoming this slight residual magnetism and hence is filtered out. It should be observed that the beginning of one impulse is of opposite polarity from the end of the preceding impulse since at the end of an impulse the magnetic field strength traversed by the pick-up unit is decreasing while at the beginning of the impulse the field strength is increasing. A jack 16 may be provided for plugging in a sensitometer for testing the equipment by artificial impulses of known value. One suitable type of sensitometer is the subject of the copending application Serial No. 62,935 filed Feb. 8, 1936, now Patent No. 2,170,515.

When the pick-up unit 11 passes over a flaw in the rail indicated by a dotted line 21, a voltage is induced in the coil 22 (assuming that the rail has been properly prepared, as by magnetization thereof to polarize the flaws) and this voltage causes a current to flow through the coil 22 and the transformer 13. The latter induces a higher voltage in the secondary coil 15 which is impressed on the control grid 23 of the first amplifying tube 24. This tube may desirably be of the type known commercially as a 6J7 tube. Each of the tubes illustrated includes a heater 25 for heating the cathode energized in conventional manner from an "A" battery. According to the well-known function of such tubes the voltage wave impressed on the control grid 23 causes an amplified current wave to flow from cathode 26 to the plate 27 and through the plate circuit. The rest of this plate circuit can be traced from the high voltage battery "B" through a grid biasing resistance 28 to the cathode 26, and from the plate 27 through resistance 29 back to the battery "B." This plate current flowing through the resistance 29 creates an I. R. drop of potential which is impressed through condenser 31 onto control grid 32 of the second tube 33, which may be of the type known commercially as a 6K7 tube. The control grid 32 is similarly biased by resistance 35 and is provided with a grid leak 34 to permit its voltage charge to be dissipated after it has acted. The voltage impressed on grid 32 causes an amplified current wave to flow from cathode 36 to plate 37 and through resistance 39 under the influence of battery "B." The plate current flowing through resistance 39 impresses a voltage (through condenser 41) on control grid 42 of the output tube 43, which may be a tube known commercially as a 6F6 tube.

It should be noted at this point that grid biasing resistances 28 and 35 should be of such value as to enable the associated tubes to reproduce the full wave impressed on their grids. Thus, the shape of the wave impressed on the grid 42 will be approximately the same as that impressed on the grid 23 by the secondary coil 15 of the input transformer. It is desired, however, that this tube 43 act as a rectifier to cut off half of the wave and also that it have the greatest possible change of current output. Accordingly, the biasing voltage on the control grid 42 is controlled by a "C" battery 44 and a potentiometer 45 so that the tube operates very close to its cut-off value, that is, the grid is held sufficiently negative so that the plate current is very low.

When a positive voltage is impressed on the grid 42 through the condenser 41, a heavy current is caused to flow from the cathode 46 to the plate 47. In this instance the "B" voltage for the plate circuit is supplied by the battery "B'" and the circuit may be traced from the battery "B'" to the cathode 46, and from the plate 47 to the milliammeter 48, through the paint gun actuating relay coil 49, through the pen actuating coil 50, and through the potentiometer resistance 51 back to the battery "B'." It is thus seen that if the plate current is sufficiently heavy, the recording pen 52 and the paint gun 53 will be actuated to indicate the presence and position of the flaw. It is at this point that the regenerative feature comes into prominence in assuring adequate current for operating the indicators. A tap 56 from the potentiometer resistance 51 is connected through a condenser 57 to the primary coil of a transformer 58, the secondary coil of which is in the grid biasing circuit for the grid 42. The transformer 58 steps up the voltage impressed upon it, a ratio of 3.1 to 1 being satisfactory. The connections are such that an increase in the flow of current through the plate circuit of the tube 43 acts through the potentiometer 51 and transformer 58 to counteract the negative bias of the grid 42 thereby causing the plate current to build up quickly. Thus, the wave shape of the plate current tends toward the rectilinear shape shown in Fig. 4, even though that induced in the coil 22 and the voltage wave impressed on the grid 42 may have had a shape such as that shown in Fig. 3. The flat top of the wave is due to the fact that the tube quickly reaches its saturation point. Although this is the result of regeneration, other highly sensitive amplifying systems may be used if they have an output characterized by a like rectilinear wave shape under similar conditions. Due to the high inductance of the coils 49 and 50 the current actually produced in their circuit will not have quite the wave shape shown in Fig. 4. Nevertheless, the regenerative feature produces a quicker current surge than the system as shown would otherwise produce, and it follows that the relays 49 and 50 will be actuated in some instances when they would not be otherwise. The impedance of the output circuit which includes the relays 49 and 50 is matched to the other characteristics of the system for best power transfer. A condenser 54 may be connected across the output circuit as shown for the purpose of stabilization.

The heavy changes of current value flowing through the battery "B'" would be likely to produce changes in its voltage, at least unless it is in perfect condition. To prevent this drop in voltage from affecting the operation of tubes 24 and 33 it is preferred to use this battery "B'" as an independent battery for the output tube 43, a separate battery "B" being provided for the tubes 24 and 33.

It may be observed that the relay 49 controls the paint gun 53 through an armature 61, which controls a coil 62 associated with the paint gun, which may simply open a valve in this gun. In order for the paint gun to position the spot of paint on the rail at a position adjacent the flaw 21, it is necessary for the actuating circuit to be of a quick acting nature. To this end the armature 61 is normally connected to cause a generator or other source of current 63 to charge a condenser 64. This condenser 64 is effective upon actuation of the armature 61 to give a quick surge of current through the actuating coil 62.

The second pick-up or detector unit 12 operates in the same manner through transformer 71, tubes 72, 73 and 74, to cause a current to pass through coils 76 and 77, the coil 76 actuating the paint gun 53 in the same manner as did the coil 49, and the coil 77 operating a second pen 78 on the recording tape 79 to give a second indication of the flaw. The inductive pick-up unit 12 is preferably at an angle of 90° to the unit 11 since some types of flaws are more readily indicated by a transverse coil than by a longitudinal coil. The units may be disposed with an angular separation of 180° (this being the same as reversing their connections with their respective input transformers 13 and 71) so that the pick-up unit 11 will be effective on the first part of the induced current wave and the pick-up unit 12 on the second part thereof. The pen 52 will thus record any flaws in which the front part of the wave is sufficiently strong to actuate the relay system, and the pen 78 will record any flaws in which the back part of the wave is sufficiently strong to actuate the relay system. Other angles to the horizontal and vertical may also be used as conditions dictate.

From the foregoing it is evident that an indicating system is provided which may be regulated with ease to actuate the indicating apparatus upon any desired strength of impulse induced by the pick-up unit, while at the same time being dependably unaffected by weaker impulses. This obviously greatly facilitates the testing of rails for flaws by eliminating many false indications without danger of missing valid indications of flaws.

Fig. 2 illustrates one physical embodiment of the double amplifying unit, showing the four transformers 13, 71, 58 and 81, as well as the various tubes. The two jacks 16 for the sensitometers are preferably provided in an accessible position as shown. The four knobs 83 may control the potentiometers 14 and 51 and the corresponding potentiometers in the other half of the amplifying unit. The two grid biasing potentiometers such as the potentiometer 45 need not be accessible on the front of the unit since, once adjusted, they will not ordinarily need readjustment, except to compensate for voltage changes of the "B" and "C" batteries. Suitable switches for batteries 44 and for the heaters 25 may be provided as desired.

Although the foregoing description is sufficient to enable anyone skilled in the art to practice the invention, it has been found that the illustrated circuit works best when departing from the published information in regard to the tubes used. Accordingly, it is believed desirable to list some constants which have been found to give unusually satisfactory results. Both of the batteries "B" and "B'" are desirably 180 volt batteries. The screen grids 85 of tubes 24 and 33 are preferably connected to the battery by a tap 22.5 volts positive, the cathodes of course being connected at the negative end of the battery. The suppressor grids 88 are connected directly to the respective cathodes. Resistance 28 may be 600 ohms; resistances 29 and 39, each 100,000 ohms; grid leak 34, 250,000 ohms; resistance 35, 50 ohms; grid leak 86, 50,000 ohms. Condensers 31 and 41 may be .1 mfd. Condenser 87 may be .05 mfd; condenser 57, .5 mfd; and condenser 54, 1.0 mfd. Potentiometers 14 and 51 may be of 2,000 ohms each and potentiometer 45 may be 100,000 ohms, the associated battery 44 preferably producing about 45 volts.

I claim:

1. In a flaw detecting apparatus of the type including an inductive pick-up coil adapted to have an impulse induced therein when passing over a flaw in a rail, and indicating means responsive to this impulse for indicating the presence of a flaw, a low frequency transformer having a primary coil connected to the pick-up coil, having a secondary coil, and effective to filter out weak impulses of a nature due to surface irregularities of the rail; and an amplifier connected to amplify the impulses induced in the secondary coil and including a regenerative, vacuum tube amplifying unit for causing the output of the amplifier to be stepped up relatively more rapidly at the beginning of each impulse than is the voltage of the impulse.

2. In a flaw detecting apparatus of the type including a pick-up unit adapted to produce an electrical impulse when passing over a flaw in a rail, and indicating means responsive to this impulse for indicating the presence of a flaw, a low frequency transformer having a primary coil connected to the pick-up unit and having a secondary coil, and an amplifying system including a preliminary amplifying section having amplifying tubes, the first control grid of which is connected to the secondary coil, and an output amplifying section including a tube having its control grid normally biased substantially to the cut-off point and responsive to the preliminary amplifying section, having its plate circuit connected to the indicating means, and having a regenerative feed back means connected between the plate circuit and the control grid tending to produce a rectilinear output wave; the preliminary and output amplifying sections having independent "B" batteries in their plate circuits.

3. In a flaw detecting apparatus of the type including a pick-up unit adapted to produce an electrical impulse when passing over a flaw in a rail, and indicating means responsive to this impulse for indicating the presence of a flaw, a low frequency transformer having a primary coil connected to the pick-up unit and having a secondary coil, and an amplifying system including a preliminary amplifying section having amplifying tubes, the first control grid of which is connected to the secondary coil, and an output amplifying section including a tube having its control grid normally biased substantially to the cut-off point and responsive to the preliminary amplifying section, having its plate circuit connected to the indicating means, and having a regenerative feed back means connected between the plate circuit and the control grid of the tube, tending to produce a rectilinear output wave.

4. In a flaw detecting apparatus of the type including a pick-up unit adapted to produce an electrical impulse when passing over a flaw in a rail, and indicating means responsive to this impulse for indicating the presence of a flaw, an amplifying system for amplifying the impulse including a preliminary amplifying section having amplifying tubes, the first control grid of which is responsive to the pick-up unit, and an output amplifying section including a tube having its control grid normally biased substantially to the cut-off point and responsive to the preliminary amplifying section, having its plate circuit connected to the indicating means, and having a regenerative feed back means connected between the plate circuit and the control grid tending to produce a rectilinear output wave; the preliminary and output amplifying sections having independent "B" batteries in their plate circuits.

5. In a flaw detecting apparatus of the type including a pick-up unit adapted to produce an electrical impulse when passing over a flaw in a rail, and indicating means responsive to this impulse for indicating the presence of a flaw, an amplifying system the amplifying the impulse including a preliminary amplifying section having amplifying tubes, the first control grid of which is responsive to the pick-up unit, and an output amplifying section including a tube having its control grid normally biased substantially to the cut-off point and responsive to the preliminary amplifying section, having its plate circuit connected to the indicating means, and having regenerative feed back means connected between the plate circuit and the control grid, tending to produce a rectilinear output wave.

6. In a flaw detecting apparatus of the residual magnetism type including a pick-up unit adapted to produce an electrical impulse when passing over a flaw in a rail, and indicating means responsive to this impulse for indicating the presence of a flaw, an amplifying system for amplifying the impulse including a preliminary amplifying section having amplifying tubes, the first control grid of which is responsive to the pick-up unit, and an output amplifying section including a tube having its control grid normally biased substantially to the cut-off point and responsive to the preliminary amplifying section, having its plate circuit connected to the indicating means, having regenerative feed back means connected between the plate circuit and the control grid, tending to produce a rectilinear output wave, and having a stabilizing condenser connected across its plate circuit.

7. In a flaw detecting apparatus of the type including a pick-up unit normally producing no current but adapted to produce an electrical impulse when passing over a flaw in a rail, and indicating means responsive to this impulse for indicating the presence of a flaw, a low frequency transformer having a primary coil connected to the pick-up unit, having an iron core and a secondary coil, and effective to filter out weak impulses of a nature due to surface irregularities of the rail; and an amplifier connected to amplify the impulses induced in the secondary coil, and having sufficient sensitivity and gain to actuate the indicating means in response to even a very weak impulse produced in the secondary coil.

8. In a flaw detecting apparatus of the type including a pick-up unit adapted to produce an electrical impulse when passing over a flaw in a rail, and indicating means responsive to this impulse for indicating the presence of a flaw, a low frequency transformer having a primary coil connected to the pick-up unit, having a secondary coil, and being effective to filter out weak impulses of a nature due to surface irregularities of the rail; and an amplifier connected to amplify the impulses induced in the secondary coil, said amplifier including a vacuum tube amplifying unit biased approximately to the cut-off position, but tending, in response to a slight impulse in the secondary coil, to immediately produce a plate current at the saturation value.

9. In flaw detecting apparatus, a thermionic amplifier, an indicating device operated by the amplifier, and a detector adapted to impress an electrical impulse on the amplifier when it traverses the characteristic magnetic conditions in the vicinity of a flaw, said amplifier comprising a plurality of stages of amplification one of which is regenerative whereby a slight impulse reaching this stage will cause a substantially maximum output from the amplifier to the indicating device.

10. In a flaw detecting apparatus of the type including a pick-up unit normally producing no current but adapted to produce a full-wave electrical impulse when passing over a flaw in a rail, and indicating means responsive to this impulse for indicating the presence of a flaw, a low frequency transformer having a primary coil connected to the pick-up unit, having a secondary coil, and having an iron core within the coils whereby any slight residual magnetism in the iron core left by the final portion of a relatively strong impulse will tend to render ineffective the initial portion of a subsequent extremely weak impulse, the transformer being effective to filter out at least the initial portion of weak impulses of a nature due to surface irregularities of the rail, and an amplifier connected and constructed to amplify only the initial portion of the impulse induced in the secondary coil when the complete impulse is sufficiently strong to be induced therein and adapted to actuate the indicating means in response to such an impulse.

11. In a flaw detecting apparatus of the type including an inductive pick-up coil adapted to have an impulse induced therein when passing over a flaw in a rail, and indicating means responsive to this impulse for indicating the presence of a flaw, a vacuum tube amplifying system for amplifying the impulse to render it effective for actuating the indicating means, said amplifying system including a preliminary section and an output section, the output section including a tube having its control grid normally biased substantially to the cut-off point and responsive to the preliminary amplifying section, the amplifying system being of sufficiently high sensitivity to produce a plate current at the saturation value in the output section in response to a very weak impulse impressed on the preliminary section, and separate batteries for each of the sections in the plate circuit thereof whereby the preliminary section will be free from influence by the extreme variations in current value in the plate circuit of the output section.

HENRY W. KEEVIL.

CERTIFICATE OF CORRECTION.

Patent No. 2,223,371. December 3, 1940.

HENRY W. KEEVIL.

It is hereby certified that error appears in the printed specification of the above numbered patent requiring correction as follows: Page 4, first column, line 11, claim 5, for the word "the" first occurrence, read --for--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.